United States Patent
Cross

[19]

[11] Patent Number: 6,146,006
[45] Date of Patent: *Nov. 14, 2000

[54] METHOD AND APPARATUS FOR LIGHT TRANSMISSION

[75] Inventor: David M. Cross, Arlington Heights, Ill.

[73] Assignee: Flexalite Technology Corporation, Naperville, Ill.

[ * ] Notice: This patent is subject to a terminal disclaimer.

[21] Appl. No.: 09/102,341

[22] Filed: Jun. 22, 1998

Related U.S. Application Data

[62] Division of application No. 08/802,526, Feb. 20, 1997, Pat. No. 5,879,076, which is a continuation of application No. 08/386,105, Feb. 8, 1995, abandoned.

[51] Int. Cl.$^7$ ................................ F21L 15/08; F21V 8/00
[52] U.S. Cl. .......................... 362/555; 362/582; 362/103; 362/108
[58] Field of Search ..................... 362/551, 582, 362/583, 555, 103, 108, 800, 806

[56] References Cited

U.S. PATENT DOCUMENTS

| | | | |
|---|---|---|---|
| 4,367,515 | 1/1983 | Beard | 362/103 |
| 5,027,259 | 6/1991 | Chujko | 362/26 |
| 5,128,843 | 7/1992 | Guritz | 362/103 |
| 5,249,106 | 9/1993 | Barnes et al. | 362/551 |
| 5,375,044 | 12/1994 | Guritz | 362/103 |
| 5,434,759 | 7/1995 | Endo et al. | 362/108 |
| 5,502,903 | 4/1996 | Barker | 362/103 |

*Primary Examiner*—Thomas M. Sember
*Attorney, Agent, or Firm*—Lee, Mann, Smith, McWilliams, Sweeney & Ohlson

[57] ABSTRACT

A method and apparatus for light transmission adapted for use in a reflective belt, safety vest, or similiar devices requiring visibility of a bright and/or reflective material where a light source of one or more lighting elements is positioned to transmit light along a self-supporting elongated light transmitting member of a hot-melt adhesive thermoplastic material and a flashing circuit for the light source which includes a battery pack or any other power source convertable to D.C. voltage. The hot-melt adhesive is of a high clarity, highly flexible material which transmits light in a highly visible manner within an elongated casement of material formed of a light-colored backing material and a front strip of a translucent material adapted to transmit the light driven along the member by the light-emitting source. Any light-emitting source, either visible or invisible would be suitable for the transmitting device. Similarly, the casement of material, elongated members, light-emitting sources and circuit and D.C. power source could be mounted on either the front and/or rear panel of a safety vest where the vest is desirable for high visibilty in darkness or dimly lit situations.

26 Claims, 4 Drawing Sheets

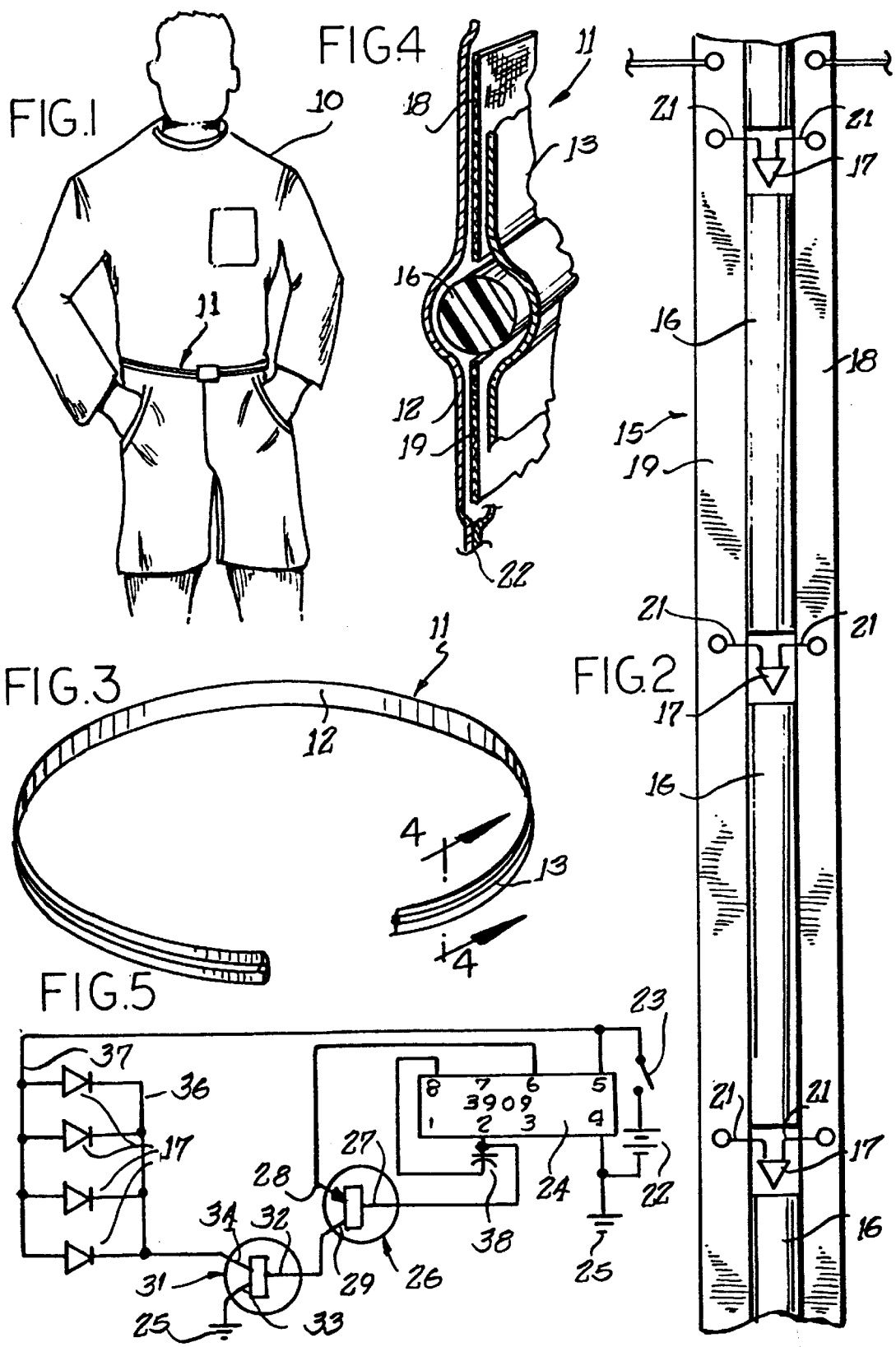

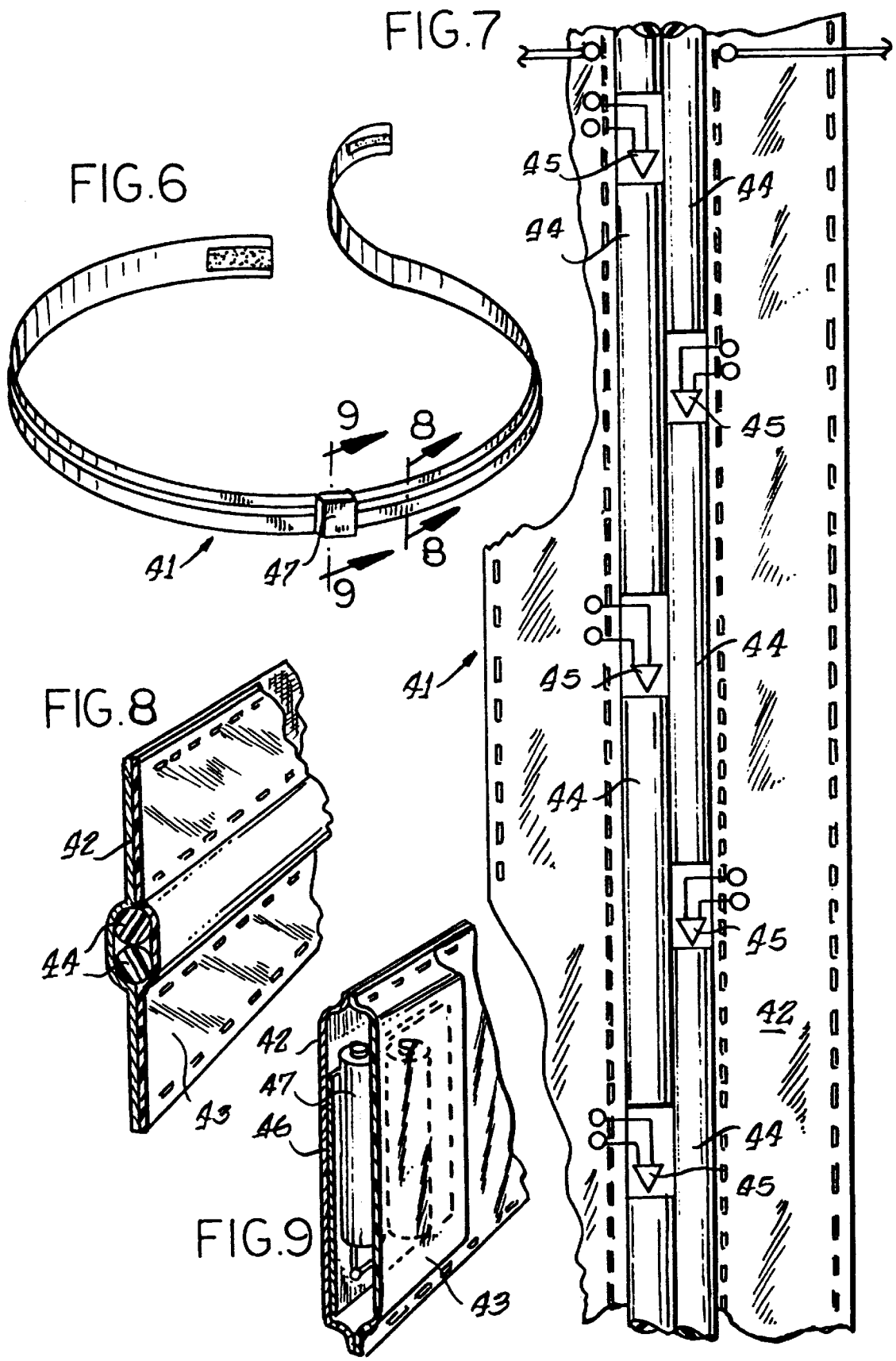

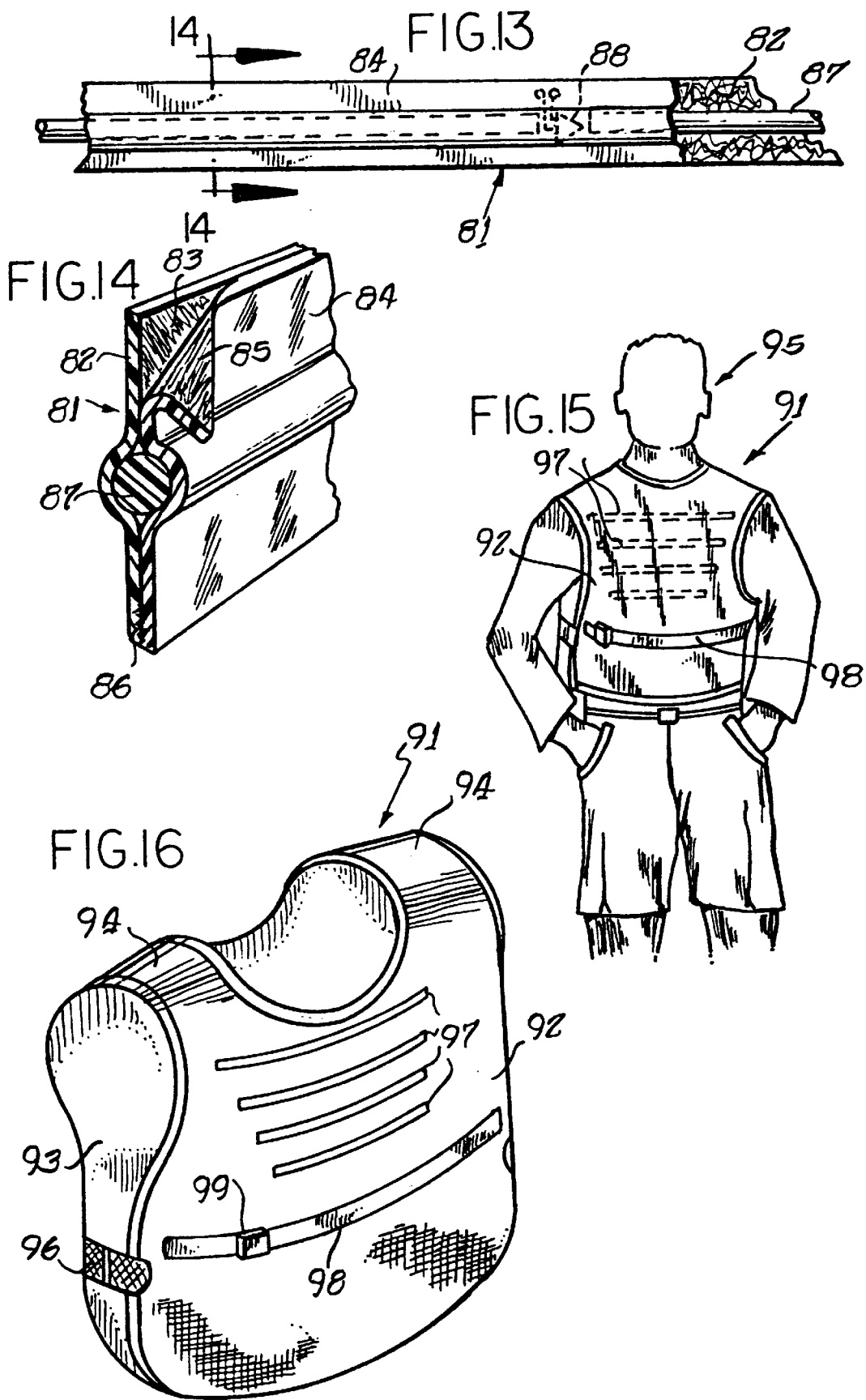

METHOD AND APPARATUS FOR LIGHT TRANSMISSION

RELATED APPLICATIONS

This application is a division of U.S. patent application Ser. No. 08/802,526, filed Feb. 20, 1997, now U.S. Pat. No. 5,879,076, which is a continuation of U.S. patent application Ser. No. 08/386,105, filed Feb. 8, 1995, and now abandoned.

FIELD OF INVENTION

The invention disclosed herein relates to the field of light transmission and more particularly to a self-supporting light conductive medium and the use of the medium as a light transmitting material for use in reflective belts, vests, helmets, etc. for safety and similar considerations.

BACKGROUND

In recent years, interest in people's well-being and health has come to the forefront in the United States and many other countries, such that individuals and groups of people running, jogging or walking for exercise on the streets, sidewalks, parks and running trails in the cities and country are becoming a common occurrence. In view of time limitations, many people run before work or afterwards in the evenings at dusk or in darkness. Where light is dim or darkness has fallen, lighting on the streets occupied by runners, because of the lack of or disrepair of sidewalks, is minimal as street lights are normally located at street corners and there are large intervals in long street blocks without lighting thus runners are not always clearly seen. Another factor affecting visibility is the dark clothing worn by many runners which does not reflect light so that runners are not easily seen by motorists driving on the streets when runners are present.

Recent attempts to make runners more visible include efforts to have runners wear white or light-colored clothing to be more easily seen from the lighting projected from moving vehicles, or to provide running clothing such as jackets with light-reflective tape on the front and back which will catch and reflect the light from the moving vehicles. Even with these measures, accidents involving runners and moving vehicles are numerous which could otherwise be avoided. Obviously, where a runner or jogger and a moving vehicle collide, the runner will sustain more serious injuries, and runner fatalities by being struck by a moving vehicle have risen in number in recent years.

To overcome these problems and the attendant injuries and fatalities and the expense involved, efforts are being made to provide devices which will make runners more visible under circumstances of darkness or poor visibility. One common device is a reflective vest which is worn on the torso of the runner having reflective tape situated in either horizontal and/or vertical directions on the vest, which tape will reflect the light from moving vehicles; however, if the driver has not turned on his lights at dusk, the vest becomes academic. In a similar manner, a reflective belt worn by a runner is not effective unless he or she is running where light from the street lamps will shine on the reflective material or the lights from a vehicle are directed towards the belt.

More recently, various types of individual powered light transmitting devices are being worn by the runner or jogger in an attempt to create greater visibility at dusk or in darkness. Such light-transmitting devices include those for attachment to one or more limbs of the participant, such as a leg light which is attached to a limb of the runner and has a self-contained battery pack, a lamp and a reflector to provide a continuous beam of light. Other types utilize a flashing or blinking light with a dispersive lens to project the light. Also, flashing airplane strobe lights are available which can be clipped to one's belt or clothing to provide a high visibility light source to make one more visible in the darkness. However, these devices are limited in either the strength of the light source or the angle over which the light is visible; most of the devices not being visible over 160 to 180 degrees. Thus, if a vehicle is approaching the runner at an angle from which the device is not visible, such as from the side, the driver may not see the runner until a collision cannot be avoided. To overcome this, multiple lamps may be utilized, but this approach adds extra weight and discomfort for the runner. Also, many of the reflective belts use an electroluminescent material having a relatively low level light source providing only limited visibility.

The present invention overcomes the above noted limitations and shortcomings of previously known light-emitting devices by providing a much higher intensity light which can be seen over a great distance and can be incorporated into a reflective belt or vest that is comfortable to be worn by the runner and makes the runner visible from virtually any angle of approach by a passing motorist.

SUMMARY OF THE INVENTION

The present invention relates to a method and apparatus for light transmission which is more effective in providing a light transmitting device of a higher intensity than those presently utilized in safety devices, such as reflective below and safety vests. The device comprises a light source such as a flashlight bulb, light-emitting diode (LED), etc. and a self-supporting light conductive medium in the form of one or more generally elongated members of a flexible thermoplastic commonly used as a hot-melt adhesive. The hot-melt adhesive material may be formed in a variety of lengths and cross sectional profiles and in varying degrees of clarity or transparency. The material is extremely flexible and of a high transparency or clarity, so that when the light source is positioned at the end of the member, the light is transmitted down the length of the member with a relatively high intensity providing a high light visibility compared to electroluminescent material.

The present invention also comprehends a light-emitting device which, because of its high flexibility, can be incorporated into reflective belts and/or vests that are worn on the body of the runner or other user and which will conform to the body contours without discomfort for the wearer. One method of using the hot-melt adhesive members is in the utilization of hot-melt adhesive rods in generally axially aligned end-to-end lengths with light-emitting diodes interposed between the rods and a pair of electrically conductive fabric material strips paralleling the rods and having connections from the fabric to the diodes. Such a structure can be formed in numerous ways, such as by extrusion, injection molding, etc.

The present invention further comprehends the provision of a light-emitting belt wherein the belt is formed of strips or bands of "Velcro" material where the loop strip is opaque and light reflective and the hook strip is of a translucent material allowing the transmission of light, the members and diodes being centrally located between the strips and the strips formed around the members and joined together by the hook and loop structure of the "Velcro" material.

BRIEF DESCRIPTION OF THE DRAWINGS

FIG. 1 is an outline view of a wearer of a reflective belt with the belt of the present invention worn around the waist of the person.

FIG. 2 is a front plan view of one embodiment of the light-emitting source for use in a reflective belt.

FIG. 3 is a perspective view of a reflective belt containing the light-emitting source.

FIG. 4 is a vertical cross sectional view taken on the line 4—4 of FIG. 3.

FIG. 5 is a schematic diagram of an electronic circuit to power the diodes or other light source for the belt.

FIG. 6 is a perspective view of a second embodiment of a reflective belt utilizing retroreflective tape encompassing the diodes and light-emitting members.

FIG. 7 is a plan view of the light-emitting source with the front translucent portion of the belt omitted.

FIG. 8 is a vertical cross sectional view taken on the line 8—8 of FIG. 6.

FIG. 9 is a vertical cross sectional view taken on the line 9—9 Of FIG. 6.

FIG. 13 is a front plan view with portions broken away of a fourth embodiment of reflective belt utilizing "Velcro" fastener-type of material.

FIG. 14 is a vertical cross sectional view of the belt taken on the line 14—14 of FIG. 13.

FIG. 15 is a generally front view of a person wearing a light reflective or safety vest incorporating the light-emitting diodes and members of the present invention.

FIG. 16 is a perspective view of the vest of FIG. 15.

BEST MODES OF CARRYING OUT THE INVENTION

Figure 10:
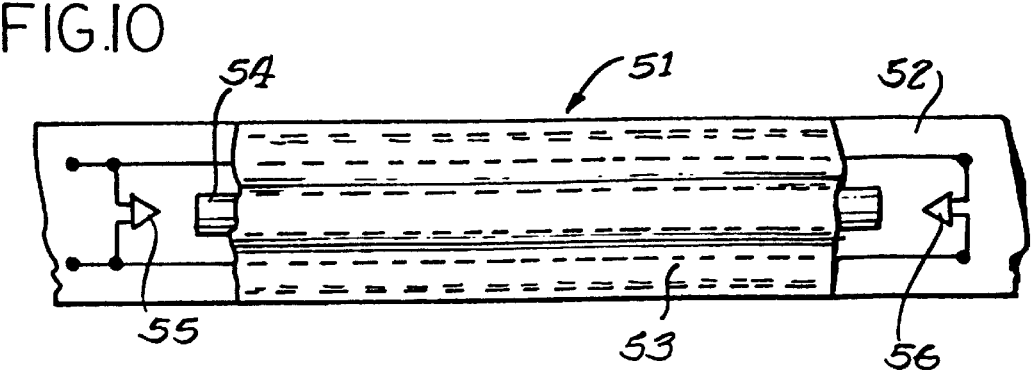
FIG. 10 is a front plan view with portions broken away of a third embodiment of the belt using a different arrangement of diodes with the light-transmitting member.

Referring more particularly to the disclosure in the drawings wherein are shown illustrative embodiments of the present invention, FIG. 1 discloses a person 10, either a child or adult, who would have occasion to use an illuminated belt 11 of the present invention. The belt 11 is shown as encircling the waist of the wearer, which may be a child that is playing in the dark or an adult who may be running or walking in the dark and wishes to be seen by passing motorists. Such a belt could be especially appropriate for policemen directing traffic or firemen on call at a nighttime fire.

The belt 11 is formed of an elongated backing strip 12 of an opaque, light-reflective material and an elongated translucent front strip 13 of material through which light may be transmitted and seen by others. Within the tube or casement formed by the backing and translucent strips of material is a light transmitting device 15 which consists of one or more elongated members 16 of a substantially transparent or clear thermoplastic material of a form commonly known as a hot-melt adhesive material; which material includes an adhesive primarily composed of an ethylene-vinyl acetate manufactured by the H. B. Fuller Company of St. Paul, Minn. and denoted as stock No. 110, a low-density polyethylene manufactured by Ad-Tech Plastic Systems & Corp., a division of Adhesive Technologies and denoted as a "Crafty" hot-melt adhesive, "Crafty" being a registered trademark of Ad-Tech Plastic Systems Corp., a polypropylene thermoplastic, or a polyamide adhesive denoted as #7820 Hysol Manufactured by Hysol Engineering Adhesives of Seabrook, N.H. All of the above-identified materials have great flexibility and have a high degree of clarity or transparency. The H. B. Fuller ethylene-vinyl acetate material comes in pellet, pillow and rods of indeterminate lengths. These rods are highly flexible and the degree of transparency is dictated by the heating of the material in the range of 300 to 350 degrees P. and rapidly cooling the material.

To provide a light-transmitting source for the rods or other elongated members, a plurality of light-emitting diodes 17 are located at intervals between the ends of the axially extending members 16 within the belt 11. Also, paralleling the rods are two strips or bands 18, 19 of a conductive fabric such as "Flectron", a registered trademark of the Monsanto Company. The fabric is a nickel or nickel/copper mesh material which will conduct current from a power source (see FIG. 5) to the diodes by connecting wires 21.

The members 16 are of any suitable length depending on the degree of desired light transmission with the diodes 17 interposed therebetween and may be positioned either between the elongated strips 12, 13 of material by locating the members, diodes and conductive fabric between the strips with the strips sewn together at their outer edges 22; the plastic material, conductive fabric and diodes being fed into an extruder and extruded with the thermoplastic material formed into a desirable cross sectional profile and the diodes and conductive means imbedded in the plastic which acts as an electrical insulator for the conductive fabric and diodes; or the fabric and diodes may be placed in a suitable mold and the hot-melt adhesive thermoplastic material injection or transfer molded around the light conductive apparatus and quickly cooled to provide the greatest degree of transparency.

The members 16 are of suitable lengths of ethylene-vinyl acetate thermoplastic, and the light-transmitting source 17 may be any light-emitting source, either visible or invisible, such as near infra-red or infra-red light, etc.; with more common forms of lighting including flashlight bulbs of a relatively high intensity, light-emitting diodes, halogen lamps or lasers. The conductive material can be a conductive fabric as shown or any other suitable electrically conductive textile, polymer, liquid, gas, metal or any combination of such materials to conduct electrical energy to the light-emitting source's electrical inputs. The light conductive material also may act as electrical insulation for the unit.

FIG. 5 is a schematic diagram of a suitable electrical circuit for supplying power to the belt of the present invention, which circuit includes a 3.0 volt D.C. battery 22 connected in series with a switch 23 across terminals 4 and 5 of a 3909 LED flasher chip 24, the terminal 4 leading to a common ground 25. A first transistor 26 has a base 27 connected to terminal 2 of the chip and an emitter 28 connected to terminal 6. A collector 29 of the transistor is connected to the bass 32 of a second transistor 31 having an emitter 33 connected to the common ground 25 and a collector 34 leading to one side 36 of a plurality of diodes 17; the opposite sides 37 of the diodes being connected to the battery 22 with the diodes in parallel. Also, a capacitor 38 is connected between terminals 2 and 8 of the chip.

A second embodiment of the reflective belt 41 is shown in FIGS. 6 through 9 wherein the belt is formed of a retroreflective material known as "Reflexite", a registered trademark of the Reflexite Corporation. This belt consists of a white backing piece or elongated strip 42 that reflects light forward and a front elongated strip 43 that is a vinyl lens for light magnification. The members 44 and diodes 45 and their connections are positioned within the tube or casement formed b the strips 43 and 44 along with a circuit board 46 containing a circuit such as shown in FIG. 5 and a battery pack 47 providing a power source for the circuit. The vinyl lens diffuses the light from the rods more evenly along the entire length of the rods so that the light is projected a substantial distance either in a constant glow or as a flashing or blinking light.

A third embodiment of a reflective belt 51 is disclosed in FIG. 10 wherein the belt is formed with a backing strip or band 52 and a front translucent strip or band 53 with one or more elongated light-transmitting members 54 positioned between a pair of light-emitting diodes 55 and 56 directed in opposite directions to direct the light from the diodes down the member 54. In this embodiment, the diodes 55 and 56 may be of different colors and blink or flash at different rates so that a multicolored flashing belt is provided for the wearer.

Figure 11:
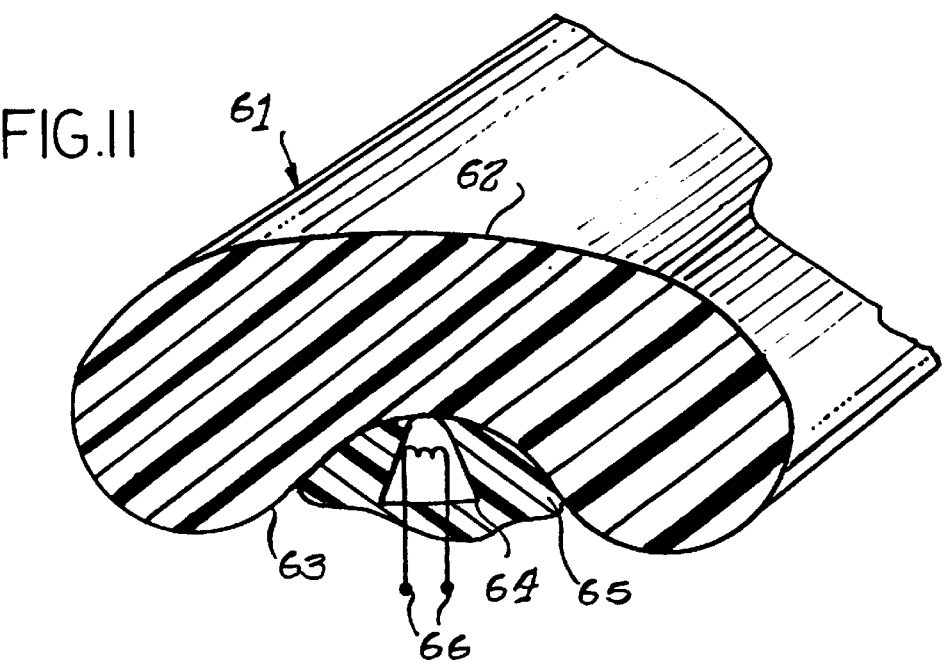
FIG. 11 is an enlarged perspective view taken in cross section showing another form of light-emitting member with the diodes embedded in hot-melt adhesive joined to the member.

As seen in FIG. 11, an elongated light-transmitting member 61 has an irregular profile with a rounded top surface 62 and a recessed lower surface 63 formed of the hot-melt adhesive plastic. Longitudinally spaced diodes 64 are received within the central concave recess 63 of the member 62; the diodes being embedded in hot-melt adhesive 65 formed around the diodes and filling the recess 63; the diodes being positioned to direct light along the length of the member 62. Suitable connections 66 to provide power to the diodes are also embedded in the hot-melt adhesive 65.

Figure 12:
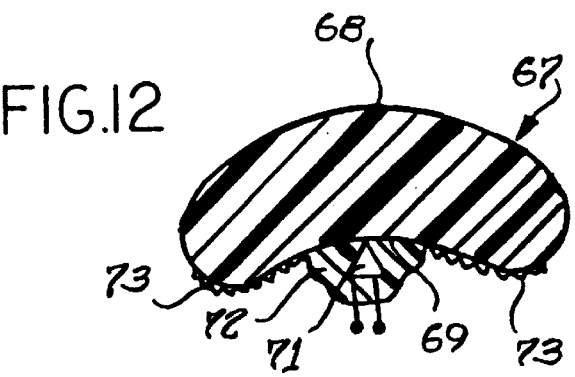
FIG. 12 is an enlarged cross sectional view of another form of light-emitting member similar to that shown in FIG. 11.

FIG. 12 discloses another elongated light-emitting member 67 similar to that shown in FIG. 11, the member having an irregular profile with a rounded top surface 68, a concave recess 69 on the lower surface receiving the longitudinally-spaced diodes 71 within applied hot-melt adhesive 72 and positioned to direct light along the member. Formed on the lower surface is some type of a reflective device, such as light reflecting microprisms 73 which will enhance the light transmission characteristics of the member. Both the members 61 and 67 may be extruded from a suitable extruder and the diodes and hot-melt adhesive applied to the member as it exits from the extruder. Also, suitable rollers or other components may be used to provide the prism surface of the member 67.

A fourth embodiment of the reflective belt 81 is shown in FIGS. 13 and 14 wherein elongated strips of translucent nylon, polypropylene, polyethylene or polyester of "Velcro", a registered trademark of the Velcro Company, "Cosmolon", a registered trademark of YKK, or similar material having the hook and loop type material is utilized to form the belt or casement housing the members 87 and diodes 88. The belt is formed of a backing strip 82 of a "Velcro" type material containing the loops 83, which strip is of a white or light colored material to reflect the light transmitted from the rods forward. A front translucent strip 84 of "Velcro" material contains the power hook 85 material. The members and light source are sandwiched between the "Velcro" strips of material having the loops and hooks facing each other so the members, lights and connective material are located within the tube formed by the "Velcro" strips and the hooks and loops join the strips together at their edges 86 to form the belt.

FIGS. 15 and 16 disclose the use of a suitable light source and reflective material in a safety vest 91 such as worn by workers in numerous industries, including workers on railroad tracks, road construction, etc. Such a vest can also be used by cross section without affecting the light transmission properties of the material; members also may be joined at their ends with only minimal loss of light transmission therethrough. Light can be transmitted through the material at any angle, not only from the ends of the members. Thus, light may be projected at the members perpendicular to the axis thereof or at any other angle to such axis and the light will be transmitted through the material. Available as substitutes for the ethylene-vinyl acetate plastic are low-density polyethylene, polypropylene, a copolyester plastic identified as "Spectral manufactured by Eastman Chemical Company and a polyamide thermoplastic manufactured by Hysol Engineering Adhesives identified as #7820 Hysol or combinations thereof; although these materials may or may not be as highly flexible as the ethylene-vinyl acetate plastic. For example, the "Spectar" material is a relatively hard plastic with high optical clarity but more rigid than ethylene-vinyl acetate thermoplastic. The light conductive material emits light in all directions from all planes, internal and external when driven by a light-emitting source. Also, where the device may be used in a flammable situation, the thermoplastic hot-melt adhesives may be treated with a suitable flame retardant to prevent fires or explosions.

Other appropriate materials, which are clear sealants rather than hot-melt adhesives include the following commercial products available as clear gels to be applied in a bead of any appropriate length. Such products include "Liquid Seal", trademark of the Macco Adhesives Division of the Glidden Company; "Shoe Goo" and "Shoe Goo II", registered trademarks of Eclectic Products, Inc.; and "Amazing Goop" adhesive, a trademark of Eclectic Products, Inc. The latter product is a gel formed essentially of propyl acetate and petroleum distillate. Each of these products is applied as a gel which then hardens into a flexible bead of sealant that can be utilized for light transmission.

The light output strength can be increased by selectively scoring the external planes of the light conductive material or in addition can be increased by selectively backing planes of the light conductive material with a suitable reflective material. Dyes or colorants can be added to the light conductive medium to vary the effect created thereby. Also, the visible light output of red, green and blue light-emitting diodes can be combined with the members in the belt or vest, etc. in which the light passes through the core or along the surface of the light conductive medium to achieve an array of a sixty-four color spectrum. Also the light conductive members or strands may be layered, bundled or weaved in several combinations to achieve desired light output characteristics.

Although the circuit shown in FIG. 5 powers the light source with a 3.0 volt battery pack, other available circuits including different chips could be utilized along with other power sources, either D.C. or A.C. which is convertible to D.C. voltage of a desired voltage and current.

What is claimed is:

1. A portable reflective belt to be worn by a user of the portable reflective belt comprising a belt formed of a flexible material and having a length to allow it to encircle the waist of the user, a battery pack and circuit mounted on said belt, said belt providing an elongated envelope containing a plurality of light sources spaced along the length of the belt, and at least one elongated light-transmitting member having said light sources positioned therealong and acting to transmit the light along the length of said member, said member being formed of a flexible, substantially transparent hot-melt adhesive thermoplastic material providing exceptional light transmission characteristics.

2. A reflective belt as set forth in claim 1, in which said light source is a halogen lamp.

3. A reflective belt as set forth in claim 1, in which said belt comprises a backing layer of a light reflective material and a front layer of a translucent plastic material.

4. A reflective belt as set forth in claim 1, wherein said light source is powered by a battery powered circuit providing a flashing characteristic through the light transmitting members.

5. A reflective belt as set forth in claim 1, wherein said belt is formed from a retroreflective material comprising a white backing layer and a front vinyl lens for dispersing the light from the members through said lens.

6. A reflective belt as set forth in claim 1, wherein said belt is formed of a pair of strips of "VELCRO" material with the loops and hooks of the facing material surfaces acting to encompass the light-transmitting members and light source along a central portion and engaging with each other along the edges to form the casement.

7. A reflective belt as set forth in claim 6, wherein said loop strip is of a light-reflecting material and said hook strip is of a translucent material forming a casement for the light-transmitting means.

8. A reflective belt as set forth in claim 1, wherein said light-transmitting plastic may have one or more dyes or colorants added thereto.

9. A reflective belt as set forth in claim 1, wherein said light-transmitting means includes a light source combining red, green and blue light emitting diodes so as to achieve a color in an array of a sixty-four color spectrum.

10. A reflective belt as set forth in claim 1, in which said light-transmitting members may be combined with other materials in a layering, weaving or bundling fashion so as to achieve desired light characteristics.

11. A light reflective belt as set forth in claim 1 in which a light-emitting diode is located at each end of a light-transmitting member with the pair of diodes directed towards the opposite ends of the member.

12. A reflective belt as set forth in claim 1, in which said elongated member has diodes adhesively joined to or encapsulated within the member at spaced intervals therealong.

13. A reflective belt as set forth in claim 12, wherein the profile of said member includes a rounded top surface and a concave recess formed on the lower surface, said diodes and hot-melt adhesive material being inserted into the recess at spaced intervals along the member.

14. A reflective belt as set forth in claim 1, in which said diodes are encapsulated within said hot-melt adhesive, the lower surface of said member being formed with light reflecting microprisms.

15. The safety belt according to claim 1, wherein the backing strip comprises a reflective material and the safety belt contains a front layer of a translucent plastic material positioned over the light source and the member.

16. A reflective belt as set forth in claim 1, wherein the light source may emits any visible or invisible light capable of being transmitted down the transparent members.

17. A reflective belt as set forth in claim 1, in which said light source is a plurality of light-emitting diodes.

18. A reflective belt as set forth in claim 1, in which said light source is a laser beam.

19. A safety vest to be worn by a person to be seen on or nearby roadways and highways, comprising a vest garment of colorful and reflective material having a front panel and a back panel joined over the shoulders, and means to connect said front and back panels by side attachment means, and a light transmitting strip on either the front or back panel or both, each said light-transmitting strip having an elongated encompassing casement of material and containing one or more light-transmitting members of a flexible homogenous hot-melt adhesive thermoplastic material and one or more light sources at the ends of said members, and a battery pack and circuit for flashing the light sources.

20. A safety vest as set forth in claim 19, in which each light-transmitting strip is an independent unit with its own battery pack, circuit and light-transmitting means.

21. An apparatus comprising at least one light source and at least one member of a flexible and substantially transparent hot-melt adhesive thermoplastic material characterized by its ability to transmit and radiate light, said light source being positioned adjacent the member.

22. The apparatus according to claim 21 wherein the light source is embedded in the member.

23. The apparatus according to claim 21, wherein the hot-melt adhesive thermoplastic is selected from the group consisting of a ethylene-vinyl acetate; a low density polyethylene; polypropylene; and polyamide.

24. An apparatus comprising at least one light source and at least one member of an elongated flexible homogenous hot-melt adhesive thermoplastic material having a longitudinal axis, the light source being positioned along the longitudinal axis of the member.

25. A safety belt comprising an elongated and substantially transparent hot-melt adhesive thermoplastic material having a round top and a lower surface having a concave recess formed therein; a light reflecting structure formed on the lower surface; and a light source embedded in hot-melt adhesive material positioned in the recess at spaced intervals along the material.

26. The safety belt according to claim 25 wherein the light reflecting structure is a microprism.

* * * * *